July 11, 1961 H. GIEREN 2,991,541
METHOD OF PRODUCING COMPOSITE BUSHINGS
Filed Oct. 10, 1958

INVENTOR
HEINRICH GIEREN
BY Dickens and Craig
ATTORNEYS

# United States Patent Office 2,991,541
Patented July 11, 1961

2,991,541
METHOD OF PRODUCING COMPOSITE BUSHINGS
Heinrich Gieren, Hauptkanal, Papenburg (Ems), Germany
Filed Oct. 10, 1958, Ser. No. 766,435
10 Claims. (Cl. 29—149.5)

The present invention relates to a method of producing composite bearing bushings of steel and lead bronze or similar material.

Composite bearing bushings consisting of a steel jacket and a lining of lead bronze or similar material are often made by a continuous method, sometimes called "strip lining." It is especially applied if the steel jacket or backing of the bushing has only a thin or medium wall thickness of, for example, 1 to 6 mm. This method consists in continuously casting a lining of lead bronze upon a steel strip which is held perfectly level and under tension, and the metallurgical and mechanical characteristics of which render such steel strip especially adapted for such use. The composite steel strip thus produced is then cut up into small flat plates which are pressed to form semi-cylindrical bushing sections. The deforming strains and tensions in the steel which in the subsequent treatments would lead to uneven wall thicknesses of the steel backing as well as of the lining which has been cast thereon may be easily overcome by rerolling the lined strip. This strip-lining method is, however, rather expensive both insofar as the required apparatus and the performance of the method is concerned, and it is economical only if used for a mass production of bushings.

There is another known method of producing composite bearing bushings, the so-called "roll" method, a centrifugal method in which tubular sections of steel of a diameter equal to that of the bushing to be made, but of several times its width, that is, in lengths of about 200 to 400 mm., are lined by centrifugal force and then divided into individual rings of a width of the desired bushings, whereupon these rings are divided into half shells without requiring any additional pressing operation. Although there need be no fear that half-shell bushing sections which are made by this roll method might become deformed in their course of production since the diameter of the tubular section which corresponds to the diameter of the bushing is relatively small, there is a considerable danger that the hollow tube or roll might bend. This, in turn, means that it can only be made of a rather short length. Consequently, and also in view of the greater amount of work to be carried out, this roll method is considerably less economical than the aforementioned strip-lining method.

Another known method of producing composite bearings consists in centrifugally lining a cylinder or tubular section of sheet steel which is of a vary great diameter and made of such a length that it may be divided into a large number of bushing rings or bushing sections which are subsequently shaped into half shells. The sheet steel cylinder is made of such dimensions that it will retain its shape despite the high temperature of about 1100° C. at which the lining is cast thereon under centrifugal force. It will therefore not suffer any tensional or other deformations which might affect the true cylindrical shape of the steel jacket or the uniformity of the cast-on lining. The wall thickness of the steel cylinder was therefore either made so great that deformations were thereby avoided, which, in turn, required that the steel backing had to be cut down on a lathe in order to attain the prescribed wall thickness thereof, or the diameter of the steel cylinder was made smaller than in the last-mentioned case with the result that the number of half shells produced was also smaller. It is therefore quite evident that this method was very uneconomical. Furthermore, since all of the effort had to be concentrated upon maintaining the steel cylinder in its original cylindrical shape so that it as well as the bushings produced therefrom would be free of deformations, the diameter and wall thickness of the steel cylinder were dependent upon each other and could only be varied within narrow limits. This also limited the applicability of this centrifugal method and rendered a production of large cylinders very uneconomical.

It is an object of the present invention to provide a new method of producing composite bushings which constitutes an important improvement of the old centrifugal method as previously described, especially insofar as it is far more economical than the old method and at least as economical as the strip lining method.

The present invention relates to the former centrifugal method in that it also utilizes a steel cylinder which has a length or height and a circumference or diameter many times those of the bushings to be produced, that such steel cylinder is also lined on the inside with a layer of lead bronze or similar material by casting the same thereon centrifugally, and that this lined cylinder is then likewise divided into sections and shaped into half shells which are then used in pairs to form the final bushings. However, while the old method required the steel cylinder to be made of such a great wall thickness that it would not become deformed by the effects of the thermal and centrifugal treatments of lining it, the present invention proposes to increase the wall thickness of the steel cylinder over the thickness required in the final bushings only to such an extent as will be necessary to compensate for the formation of scale during the centrifugal casting process and for a small amount of surface finishing. The present invention therefore utilizes a steel cylinder having a diameter and length which at least at this stage are chosen without any regard to the lack of stability of the cylinder to keep its true cylindrical shape due to the deforming strains and tensions caused by the centrifugal casting operation. The present invention further proposes that the steel cylinder, which may thus be made of very large dimensions and will be deformed and contain considerable strains and tensions after the lining of lead bronze or similar material has been cast thereon, is to be machined in one piece before it is finally divided into bushing sections. This is to be done at first on the inside by cutting out the lining of lead bronze to the desired inner diameter and to a wall thickness substantially equal to that of the lining of the final bushings, and then at the outside by reducing the thickness of the steel backing to that of the final bushing. In order to attain uniform results in these machining operations on the entire lined steel cylinder despite the deformations of the cylinder and its deviations from the true cylindrical shape which are caused by the strains and tensions in the steel and are due to occur through the centrifugal and thermal treatments of the cylinder, these machining operations are carried out in a special manner and by suitable means so that each layer of the cylinder, i.e. the steel backing and the inner lining of lead bronze, will have a uniform wall thickness at all points. Therefore, the invention intentionally takes into account that, when the steel cylinder is finally divided into sections, these sections will have various deformities and deviations from a true cylindrical shape. These deformations, strains, and tensions will then be corrected or compensated by the following operation of pressing each section into the shape of a half shell which operation is carried out on each separate section in which each of the two layers has a uniform wall thickness throughout. Finally, the half shells are finished in a customary manner, preferably by broaching.

It is therefore the main object of the present invention to increase the dimensions of the lined steel cylinders and to produce the largest possible number of bushing sections from each individual cylinder, and in doing so, intentionally to disregard the lack in the stability of the cylinder to keep its true cylindrical shape after the centrifugal treatment, and thus also to disregard the lack of the bushing sections to have the proper shape at this time. The invention retains, however, the advantage of the old method that the steel cylinder may be machined as a single unit before it is severed into sections which then only need to be pressed and broached to attain their proper final shape and size. The deformations of the steel cylinder may even be so great as to be noticeable to the eye. Still, the sections which are similarly deformed may be shaped into perfect bushings by a very simple pressing operation.

Further objects, features, and advantages of the present invention will be apparent from the following detailed description thereof, particularly when read with reference to the accompanying drawings, in which—

The steel cylinder 1 to be used according to the invention may be made of any desired length and diameter, depending only upon the difficulty of handling the same. It should at first be of a true cylindrical shape and have a wall thickness greater than that of the final bushings only to such a small extent as may be necessary to remove any scale or other surface blemishes from its outside and to carry out a finishing operation thereon, as will be subsequently described. Steel cylinder 1 is then provided at the inside with a lining 2 of lead bronze or similar material which is cast thereon centrifugally substantially in the same manner as in the prior centrifugal process. Through such centrifugal and thermal treatment, the thin-walled steel cylinder 1 will be affected by deforming strains and tensions and lose its true cylindrical shape and uniform surface, and such deformations will also affect the lead bronze lining 2 so that the same will have an uneven wall thickness.

Figure 1:
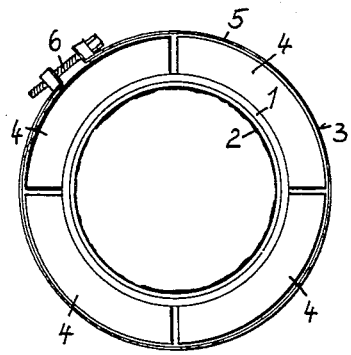
FIGURE 1 shows an end view of a lined steel cylinder secured in a clamping die for the subsequent internal work on the lead bronze lining.
Figure 2:
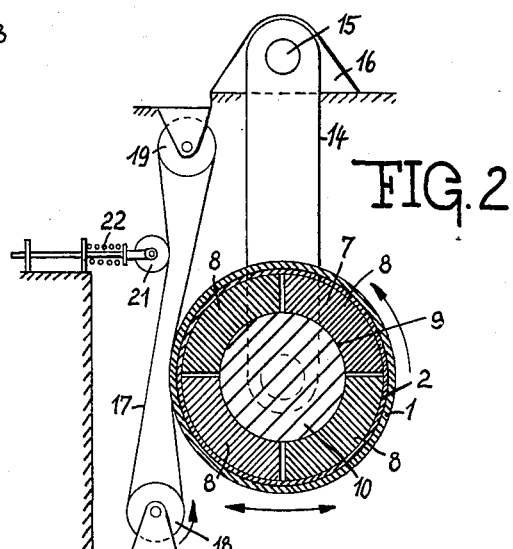
FIGURE 2 shows, partly diagrammatically and partly in a cross section taken along line II—II of FIGURE 3, a preferred mechanism for mounting the lined steel cylinder on a split mandrel which is rotatably mounted in a pendulum suspension for grinding the steel cylinder at the outside by means of a grinding belt; while—

In order to make the entire cylinder again truly cylindrical and to give each layer, that is, the deformed steel backing 1 as well as the lead bronze lining 2, a uniform wall thickness at all points thereof, the lined cylinder is preferably at first freed of any scale or the like in a pickling bath. Thereupon, the deformed cylinder is inserted into a die 3 which preferably consists of a strong cylinder, as shown in FIGURE 1, which is divided into a plurality of sections 4 and has a length at least equal to that of cylinder 1 and an inner diameter substantially corresponding to the outer diameter of the deformed steel cylinder 1. The die further comprises a suitable clamping mechanism, diagrammatically indicated in FIGURE 1 by a steel strap 5 with a tightening bolt 6, which is adapted to tighten the cylindrical sections 4 uniformly along the entire length and circumference of cylinder 1 so as to clamp the latter and thus compress the entire cylinder 1 into its original, truly cylindrical shape. While the steel cylinder 1 is thus securely clamped on the outside, the lead bronze lining 2 is then machined concentric-cylindrically at the inside to the final wall thickness of the desired bushings, except for a small allowance for the usual final broaching of the bushings. Thereafter, cylinder 1, 2 is removed from the lathe or similar machine. The lining 2 of lead bronze is then concentric-cylindrical and throughout its length of a uniform wall thickness. The steel cylinder 1 now remains to be finished, also on the outside. For this purpose, the cylinder is then fitted upon a suitable clamping device 7 which clamps the lining 2 cylindrically along its entire inner surface and fills out the cylindrical area therein at least substantially. This clamping device may, for example, consist of two solid half cylinders, for example, of a nonferrous metal, or four solid cylindrical sectors 8, as shown in FIGURE 2, which fill out completely the cylindrical space within lining 2 and have a central conical bore 9 which corresponds to a conical shaft 10, as shown particularly in FIGURE 3, which serves as a mandrel and is inserted tightly into the two or four-part cylinder 8 so that the latter will clamp the lining 2 uniformly along its entire length. Such mounting of cylinder 1, 2 on the internal clamping device 7 may be carried out either while the cylinder is still clamped by die 3 and is thus externally of a cylindrical shape, or after it has been removed from die 3, in which event the internal clamping device 7 overcomes the deforming tensions and strains in the steel cylinder 1 until the latter is finished and removed from clamping device 7. The conical shaft 10 which is driven by a motor 11 is resiliently mounted in bearings 12 which, in turn, are preferably mounted on a pendulum suspension 13. This suspension may consist, for example, of a pair of arms 14 which are mounted on a shaft 15 which is pivotably mounted in stationary bearings 16.

Figure 3:
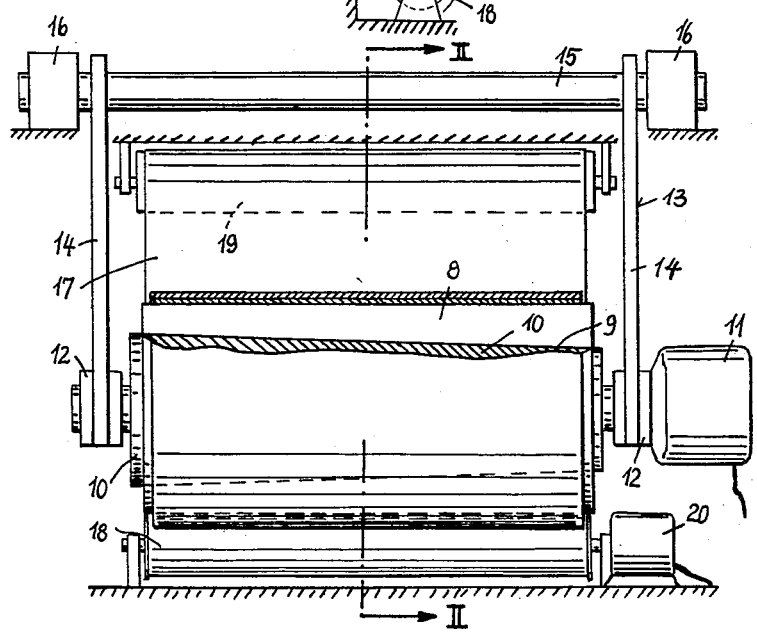
FIGURE 3 shows a front elevation of the mechanism according to FIGURE 2 together with the driving means thereof.

The small allowance in the wall thickness of steel cylinder 1 which is provided for the removal of surface blemishes thereon is then ground off uniformly at all points along its entire outer surface by means of a grinding belt 17 which may be mounted, for example, on rollers 18 and 19, one of which is driven by a motor 20. Grinding belt 17 is held under a resilient tension by a tension roller 21 which is acted upon by a spring 22. Instead of providing a grinding belt of at least the full length of steel cylinder 1, as illustrated in FIGURE 3, which grinds off the small allowance in the wall thickness at one time on the entire cylinder, the grinding belt may also be of a narrower width which is passed by suitable means along the length of cylinder 1, or, if desired, back and forth along such length either once or repeatedly. Because of the resiliently yielding engagement of grinding belt 17 with the pendulum-suspended cylinder 1, the wall thickness of the latter will be uniform at all points and of a size and finish as required in the final bushings.

Thereupon, cylinder 1 is removed from the grinding machine as well as from the internal clamping device 7. Since the deforming strains and tensions caused originally by the lining process are still present in steel cylinder 1 and the deformations of the latter from a true cylindrical shape were only temporarily pressed out while the two layers 1 and 2 were turned and ground to the proper wall thickness thereof, cylinder 1 and the lead bronze lining 2 thereon will, upon being removed from clamping device 7, again assume their deformed state because of the inherent resilience of the steel.

The cylinder is then cut up into sections of a size as required for the respective bushings, and these sections are then individually pressed into an accurate semicylindrical shape to form half shells. By this pressing operation, all of the deformations and strains, which previously caused the deviations from a true cylindrical shape and were intentionally maintained until this time, will be completely compensated and corrected. Consequently, except for the usual final operation of broaching the lead bronze lining 2 by conventional methods, the bushing sections will then be completely ready for actual use.

From the foregoing description of the invention it will be evident that it is now possible to make the steel cylinder of any desired size which might be limited only by its unwieldiness and the difficulty of handling it. It will be further evident that such size of the cylinder will have no depreciating effect upon the quality of the final bushings, that the steel cylinder does not have to be originally made of a wall thickness substantially greater than that of the steel backing of the final bushings, and that therefore the extra operation as previously required, namely, of turning or grinding a thick steel cylinder down to the required wall thickness of the bushings, as well as the unnecessary waste in valuable steel will be avoided. The centrifugal method of producing bearing bushings has thus been perfected to the highest degree of economy. It is now possible to mass-produce bushings, for example, with a thickness of the steel backing of as little as 1 mm., a width of 18 to 20 mm., and a circumference of the half shell of 86 mm., that is, with the dimensions corresponding to those of a connecting-rod bearing of a Volkswagen. These dimensions may be easily contained ten to twelve times in the length or height of the steel cylinder and eight to ten times in the circumference thereof. Such a steel cylinder would then have a length or height of 180 to 240 mm. and a circumference of 688 to 860 mm., or a corresponding diameter of about 22 to 27 cm. Such dimensions and wall thicknesses of the steel cylinders are perfectly within the range of application of the new method and, in the particular example given above, they would result in a yield of about 80 to 120 bushing half shells from each steel cylinder, and in an economy of production which very favorably compares with that of the strip lining method. Obviously, the wall thickness and other dimensions of the steel cylinders may also be smaller or greater than those mentioned above. In place of a steel cylinder which is produced from flat steel plate with the necessary properties to satisfy the requirements of a steel backing of a bushing, it is also possible to use a corresponding piece of seamless steel tubing of a suitable quality.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed by invention, what I claim is:

1. A method of producing composite bearing bushings of steel and lead bronze or similar material comprising the steps of selecting a steel cylinder having relatively large dimensions as compared to those of the individual bushings to be attained including a length and diameter far exceeding those of said individual bushings and having a wall thickness exceeding the thickness of the steel layer in the final bushings only to such an extent as required for the removal of scale forming on said steel cylinder during the lining operation and for a small amount of finishing of its outer surface, lining said selected steel cylinder by centrifugally casting a lining of lead bronze or similar material on the inner surface of said steel cylinder and thereby also producing therein deforming strains and tensions, the thickness of said cast lining being in excess of the final thickness of the lining of the individual bushings to be attained, said diameter and length of the steel cylinder being chosen independently of any possible deformations in shape caused by said lining operation, machining the lined cylinder on the inside thereof as a single unit by first turning the same on the inside thereof to reduce the lining substantially to the required uniform wall thickness of the final bushings, then reducing the wall thickness of the steel cylinder at the outside thereof substantially to the uniform wall thickness of the final bushings, then dividing the lined cylinder into sections, and then pressing each of said sections to form semicylindrical half shells and thereby compensating and correcting all deformations and strains in each individual section caused by the lining operation on said steel cylinder, and finally finishing said half shells at the inside.

2. A method of producing composite bearings of steel and lead bronze or similar material comprising the steps of selecting a steel cylinder having relatively large dimensions as compared to those of the individual bushings to be attained including a length and diameter far exceeding those of said individual bushings and having a wall thickness exceeding the thickness of the steel layer in the final bushings only to such an extent as required for the removal of scale forming on said steel cylinder during the lining operation and for a small amount of finishing of its outer surface, lining said selected steel cylinder by centrifugally casting a lining of lead bronze or similar material on the inner surface of said steel cylinder and thereby also producing therein deforming strains and tensions, the thickness of said cast lining being in excess of the final thickness of the lining of the individual bushings to be attained, said diameter and length of the steel cylinder being chosen independently of any possible deformations in shape caused by said lining operation, then clamping said lined steel cylinder cylindrically under pressure substantially along its entire outer surface in a die having an inner diameter substantially corresponding to the outer diameter of the steel cylinder and thereby temporarily correcting said deformations so that said steel cylinder has again its original true cylindrical shape, then maching said lining at the inside thereof by turning the same so as to be concentric-cylindrical and to reduce the lining substantially to the required uniform wall thickness of the final bushings, then inserting a clamping device into said lining so as to fill out the central aperture therein substantially completely and to clamp said lining cylindrically along its entire length, then removing said die from said cylinder, then reducing the wall thickness of said steel cylinder to the wall thickness of the final bushings by grinding a small predetermined amount off the outer surface of said cylinder by means of a belt grinding device, and during such grinding operation holding said cylinder and the grinding belt in a resiliently yielding engagement with each other while said cylinder is secured to and rotated by said inner clamping device, then dividing the lined cylinder into sections, and then pressing each of said sections to form semicylindrical half shells and thereby compensating and correcting all deformations and strains in each individual section caused by the lining operation on said steel cylinder, and finally broaching said half shells on the inside.

3. A method as defined in claim 1, further comprising the step of removing the scale from said lined steel cylinder in a pickling bath prior to turning said lining at the inside substantially to the wall thickness of the final bushings.

4. A method of producing composite bearing bushings of steel and of a lining material from a steel cylinder having relatively large dimensions as compared to the finished bearing bushings including a larger diameter and length than those of the final desired composite bearing bushings, comprising the steps of selecting said steel cylinder with a relatively thin wall thickness as compared to the other dimensions, said wall thickness being only slightly in excess of the desired wall thickness of the steel layer in the final bearing bushing, lining the inside of said selected steel cylinder with said lining material to produce a bearing lining at least partly and slightly in excess of the desired final thickness thereof and simultaneously and inherently therewith causing deformations and stresses in said steel cylinder, thereupon machining said composite cylinder by reducing the inner surface thereof to thereby reduce the thickness of said lining material to the desired final thickness and by reducing the outer surface thereof to thereby reduce said steel cylinder uniformly to the desired final wall thickness thereof, thereafter subdividing said composite cylinder into sections, and finishing each individual section into the shape and size of a portion of the final composite bearing bushing by pressing the same into such shape and size.

5. A method of producing composite bearing bushings according to claim 4, wherein the step of lining the inside of said selected steel cylinder includes the step of centrifugally casting said lining material against the inside wall of said steel cylinder.

6. A method of producing composite bearing bushings essentially consisting of a relatively thin-walled steel backing member and of a liner made of lead bronze or similar lining material from a steel cylinder having a wall thickness which is only slightly in excess of the predetermined desired wall thickness of the steel backing member of the finished composite bearing, the length and diameter of said steel cylinder being relatively large and far in excess of the length and diameter of the finished composite bearing, comprising the steps of centrifugally casting said liner against the inside of said steel backing member thereby producing at least some irregularities and therewith a thickness of said liner in excess of the final desired thickness thereof, while at the same time causing deformations and stresses in said thin-walled steel member, thereupon machining said composite cylinder as a unit by maching the inside thereof to thereby reduce the thickness of said liner to the final desired thickness thereof and therewith reduce any unevennesses and by machining the outside of said steel backing member to thereby reduce the same to the final desired thickness and therewith remove any irregularities in the outer surface thereof, thereupon subdividing said composite cylinder into individual sections, and finally pressing the individual sections into portions of the finished bearing bushings while simultaneously compensating for said deformations and stresses.

7. A method of producing composite bearing bushings of steel and a lining material from a steel cylinder having relatively large dimensions as compared to the finished bearing bushings including a diameter and length far exceeding those of the final desired composite bearing bushings and a circumference at least four times that of the individual finished bearing bushings, said cylinder having a relatively thin wall thickness as compared to the other dimensions thereof, said wall thickness being only slightly in excess of the desired thickess of the steel layer in the finished composite bushings, comprising the steps of selecting a steel cylinder having said desired dimensions, lining the inside of said selected steel cylinder with said lining material to produce a bearing lining at least partly and only slightly in excess of the desired final thickness thereof and simultaneously and inherently therewith causing deformations and stresses in said steel cylinder, then machining said composite cylinder by reducing the thickness of said composite cylinder at the inner surface thereof to thereby reduce the thickness of said lining material to the desired final thickness and by reducing the thickness of said composite cylinder at the outer surface thereof to thereby reduce said steel cylinder to the desired final wall thickness thereof, and thereafter axially and transversely subdividing said composite cylinder into a plurality of composite strips, and finishing each individual strip in the shape and size of a portion of the final composite bearing bushings by pressing the same into such shape and size.

8. A method of producing composite bearing bushings of steel and a lining material such as lead bronze or similar material, comprising the steps of selecting a steel cylinder having relatively large dimensions as compared to those of the individual bushings to be attained including a length and diameter far exceeding those of the individual bushings to be attained, said steel cylinder having a relatively thin wall thickness as compared to the other diemnsions thereof, said wall thickness exceeding the desired wall thickness of the steel backing member of the finished composite bushings only to the extent required for the removal of scale formed on said steel cylinder during the lining operation and for a small amount of finishing of its outer surface, lining said selected steel cylinder by centrifugally casting said lining material on the inner surface of said steel cylinder and thereby also inherently producing therein deforming strains and tensions, the thickness of said cast lining being only slightly in excess of the final thickness of the lining on the finished composite bushings, said diameter and length of the steel cylinder being chosen independently of any possible deformations in shape caused by said lining operation, thereafter machining the lined cylinder as a single unit by first turning the same on the inside thereof to reduce the lining substantially to the required uniform wall thickness of the final bushings, then reducing the wall thickness of the steel cylinder at the outside thereof substantially to the uniform wall thickness of the final bushings, then dividing the lined cylinder axially and transversely into a plurality of composite strips, and thereafter pressing each of said strips to form semi-cylindrical half shells, thereby compensating and correcting all deformations and strains in each individual strip caused by the lining operation of said steel cylinder.

9. A method of producing composite bearings of steel and a lining material such as lead bronze or similar material, comprising the steps of selecting steel cylinder having relatively large dimensions as compared to those of the individual bushings to be attained including a length and diameter far exceeding those of the individual bushings to be attained, said steel cylinder having a relatively thin wall thickness as compared to the other dimensions thereof, said wall thickness exceeding the desired wall thickness of the steel backing member of the finished composite bushings only to the extent required for the removal of scale formed on said steel cylinder during the lining operation and for a small amount of finishing of the outer surface, lining said selected steel cylinder by centrifugally casting said lining material on the inner surface of said steel cylinder and thereby also inherently producing therein deforming strains and tensions, the thickness of said cast lining being only slightly in excess of the final thickness of the lining on the finished composite bushings, said diameter and length of said steel cylinder being chosen independently of any possible deformations in shape caused by said lining operation, thereafter clamping said lined steel cylinder about its circumference under pressure substantially along its entire outer surface to thereby temporarily correct said deformations so that said steel cylinder has again its original true cylindrical shape, machining said clamped lined cylinder at the inside thereof by turning the same so as to reduce the lining substantially to the required uniform wall thickness of the final bushings, thereafter inserting a clamping means into said lining so as to fill out the central aperture therein and to clamp said lining substantially along its entire surface, then reducing the wall thickess of said steel cylinder to the wall thickness of the finished composite bushings by removing a small predetermined amount of the outer surface of said cylinder, thereupon dividing the lined cylinder axially and transversely into a plurality of composite strips, and thereafter pressing each of said strips to form semi-cylindrical half shells, thereby compensating and correcting all deformations and strains in each individual strip caused by the lining of said steel cylinder.

10. A method of producing composite bearings of steel and a lining material such as lead bronze or similar material, comprising the steps of selecting a steel cylinder having relatively large dimensions as compared to those of the individual bushings to be attained including a length and diameter far exceeding those of the individual bushings to be attained and a circumference at least four times that of the individual finished composite bushings, said steel cylinder having a relatively thin wall thickness as compared to the other dimensions thereof, said wall thickness exceeding the desired wall thickness of the steel backing member of the finished composite bushings only to the extent required for the removal of scale formed on said steel cylinder during the lining operation and for a small amount of finishing of the outer surface, lining said selected steel cylinder by centrifugally casting said lining material on the inner surface of said steel cylinder and thereby also inherently producing therein deforming strains and tensions, the thickness of said cast lining being only slightly in excess of the final thickness of the lining on the finished composite bushings, said diameter and length of said steel cylinder being chosen independently of any possible deformations in shape caused by said lining operation, thereafter clamping said lined steel cylinder about its circumference under pressure substantially along its entire outer surface to thereby temporarily correct said deformations so that said steel cylinder has again its original true cylindrical shape, machining said clamped lined cylinder at the inside thereof by turning the same so as to reduce the lining substantially to the required uniform wall thickness of the final bushings, thereafter inserting a clamping means into said lining so as to fill out the central aperture therein and to clamp said lining substantially along its entire surface, then reducing the wall thickness of said steel cylinder to the wall thickness of the finished composite bushings by removing a small predetermined amount of the outer surface of said cylinder, thereupon dividing the lined cylinder axially to form at least four separate longitudinally-extending lined sections and dividing each of said lined sections transversely into a plurality of strips, and thereafter pressing each of said strips to form semicylindrical half shells, thereby compensating and correcting all deformations in each individual strip caused by the lining of said cylinder.

References Cited in the file of this patent
UNITED STATES PATENTS

| | | |
|---|---|---|
| 1,359,331 | Chadwick | Nov. 16, 1920 |
| 1,987,752 | Salzman | Jan. 15, 1935 |
| 2,031,982 | Salzman | Feb. 25, 1936 |
| 2,058,621 | Pike | Oct. 27, 1936 |
| 2,480,114 | Bradbury | Aug. 30, 1949 |